United States Patent
Sloutsky et al.

(10) Patent No.: US 9,853,694 B2
(45) Date of Patent: Dec. 26, 2017

(54) CONTACTLESS COMMUNICATION SIGNAL TRANSFER

(75) Inventors: Michael Sloutsky, Peabody, MA (US);
Hans J. Weedon, Salem, MA (US);
Peter Bukhovko, Peabody, MA (US);
Douglas Abraham, Topsfield, MA (US)

(73) Assignee: Analogic Corporation, Peabody, MA (US)

( * ) Notice: Subject to any disclaimer, the term of this patent is extended or adjusted under 35 U.S.C. 154(b) by 508 days.

(21) Appl. No.: 13/435,442

(22) Filed: Mar. 30, 2012

(65) Prior Publication Data

US 2013/0259202 A1 Oct. 3, 2013

(51) Int. Cl.
*A61B 6/00* (2006.01)
*H04B 5/00* (2006.01)

(52) U.S. Cl.
CPC ......... *H04B 5/0075* (2013.01); *H04B 5/0093* (2013.01)

(58) Field of Classification Search
CPC .. H04B 5/0075; H04B 5/0093; H04B 5/0081; H04B 5/0087; A61B 6/032
See application file for complete search history.

(56) References Cited

U.S. PATENT DOCUMENTS

| 5,055,821 A | 10/1991 | Keller et al. |
| 5,345,231 A | 9/1994 | Koo et al. |
| 5,532,887 A * | 7/1996 | Higashiyama et al. ........ 360/64 |
| 5,577,026 A | 11/1996 | Gordon et al. |
| 6,033,370 A * | 3/2000 | Reinbold ............. A43B 3/0005 361/291 |
| 7,868,723 B2 | 1/2011 | Dobbs |
| 7,899,150 B2 | 3/2011 | Beyerlein et al. |
| 2002/0093410 A1* | 7/2002 | Nakayama et al. .......... 336/182 |
| 2005/0226380 A1* | 10/2005 | Katcha et al. ................ 378/101 |
| 2007/0035883 A1* | 2/2007 | Katcha et al. ............. 360/281.8 |
| 2007/0188284 A1 | 8/2007 | Dobbs |
| 2011/0038190 A1* | 2/2011 | Zimpfer ....................... 363/126 |

(Continued)

FOREIGN PATENT DOCUMENTS

WO 2012/166134 A1 12/2012

OTHER PUBLICATIONS

Leof et al., Contactless Power Chain, Dec. 16, 2010, WO2010/143084.*

*Primary Examiner* — Dani Fox
(74) *Attorney, Agent, or Firm* — Cooper Legal Group, LLC

(57) ABSTRACT

Among other things, one or more techniques and/or systems are described herein for transferring communication information between a stationary unit and a movable (e.g., rotating) unit, or between two movable units without contact between the units. A transmitter is configured to translate digital information into an analog signal which may be fed to an input coupler positioned within a channel of an electrically conductive member (e.g., on a first unit, such as a stationary unit). The current of the signal induces a signal in an output coupler (e.g., on a second unit, such as a movable unit). Voltage characteristics of the induced signal (e.g., which substantially correspond to voltage characteristics of the signal fed into the input coupler) may subsequently be used to reconstruct the digital data at a receiver. In this manner, information can be communicated between two non-contacting units.

20 Claims, 6 Drawing Sheets

(56) References Cited

U.S. PATENT DOCUMENTS

| | | | |
|---|---|---|---|
| 2012/0035508 A1* | 2/2012 | Van Leer | A61B 5/033 600/588 |
| 2012/0139682 A1* | 6/2012 | Carlen | H01F 27/22 336/61 |
| 2012/0235636 A1* | 9/2012 | Partovi | H02J 7/025 320/108 |

* cited by examiner

CONTACTLESS COMMUNICATION SIGNAL TRANSFER

BACKGROUND

The present application relates to the transference of information over an air-gap separating a receiver from a transmitter. It finds particular application in the context of computed tomography imaging modalities, where at least one of the transmitter and the receiver is located on a rotating gantry and an airgap separating an input coupler (e.g., for transmitting information) and an output coupler (e.g., for receiving the transmitted information) is small (e.g., 20 mm or less). However, it may also apply to others applications, such as explosive detection machines, radar antennas, etc. where communication signals are wirelessly transferred between a transmitter and a receiver.

Computed tomography (CT) imaging modalities are configured to generate volumetric data corresponding to an object under examination. In this way, three-dimensional images may be generated that allow personnel to identify security threats, determine the orientation/position of a tumor in a body, etc. To generate such data, the computed tomography imaging modality is typically configured to rotate a radiation source and detector array about the object under examination (e.g., causing the object to be viewed from a plurality of angles). For example, the radiation source and/or detector array may be mounted to a rotating gantry configured for rotation relative to a stationary unit configured to support the rotating gantry.

When an object is to be examined, the object is positioned in a bore of the rotating gantry (e.g., between the radiation source and the detector array) and radiation is emitted. Based upon the amount of radiation absorbed and/or attenuated by the object, one or more images of the object may be formed. For example, highly dense aspects of the object typically absorb and/or attenuate more radiation than less dense aspects, and thus an aspect having a higher density, such as a bone or metal, for example, will be apparent in an image when surrounded by less dense aspects, such as muscle or clothing.

Given that the radiation source and detector array are mounted on the rotating gantry, power and control information (e.g., instructing the radiation source and/or other electronic components how to operate) are typically supplied to the rotating gantry from the stationary unit. Moreover, imaging data (e.g., data generated in response to the detection of radiation by the detector array) is typically transferred from the rotating gantry to the stationary unit (e.g., for further processing and/or to be displayed to security/medical personnel).

Conventionally, slip-ring assemblies have been used to transfer power and/or information (e.g., control information and/or imaging data) between the stationary unit and the rotating gantry. Slip-ring assemblies are typically configured to transfer power and/or information between a stationary member and a movable member (e.g., a rotating gantry) and/or between two movable members, through the physical contact of two materials (e.g., via a sliding contact). For example, a slip-ring attached to the stationary member may comprise metal brushes that are configured to physically contact electrically conductive surfaces (e.g., metal brushes) comprised on a slip-ring attached to the movable member, allowing power and/or information to be transferred between the stationary member and the movable member.

While the use of slip-ring assemblies has proven effective for transferring power and/or information between a stationary unit and a movable unit (e.g., such as a rotating gantry) and/or between two movable units, conventional slip-ring assemblies may generate dust or particles (e.g., as metal brushes wear down), may be unreliable (e.g., again as contact surfaces, such as metal brushes, wear and thus may not contact as well), and/or may be noisy (e.g., as surfaces rub against one another), which may cause interference with some procedures (e.g., CT imaging). Other drawbacks of slip-ring assemblies may include cost and complexity of manufacture due to special materials and/or mechanical precision that may be required.

SUMMARY

Aspects of the present application address the above matters, and others. According to one aspect, a system for transferring information from a first apparatus to a second apparatus is provided. The system comprises a transmitter operably coupled to the first apparatus. The transmitter comprises an electrically conductive first member comprising a first channel and an electrically conductive first element positioned within the first channel without a ferromagnetic material disposed between the first element and the first channel. The first element is configured to generate a first electric field in response to a first current flow in the first element. The system also comprises a receiver operably coupled to the second apparatus. The receiver comprises an electrically conductive second member comprising a second channel facing the first channel and an electrically conductive second element positioned within the second channel without a ferromagnetic material disposed between the second element and the second channel. The second element is configured to have a second current induced in the second element based upon the first electric field, whereby information is derived from the second current.

According to another aspect, an imaging modality is provided. The imaging modality comprises a stationary unit and a rotating unit. The stationary unit comprises a transmitter configured to transmit information from the stationary unit to the rotating unit. The transmitter comprises an electrically conductive first member comprising a first channel and an electrically conductive first element positioned within the first channel without a ferromagnetic material disposed between the first element and the first channel. The first element is configured to generate a first electric field in response to a first current flow in the first element. The rotating unit comprises a receiver configured to receive the transmitted information. The receiver comprises an electrically conductive second member comprising a second channel facing the first channel and an electrically conductive second element positioned within the second channel without a ferromagnetic material disposed between the second element and the second channel. The second element is configured to have a second current induced in the second element based upon the first electric field, whereby information is derived from the second current.

According to another embodiment, a method for communicating information between a first apparatus and a second apparatus is provided. The method comprises converting a digital signal to an analog signal comprising a first current and passing the first current through an electrically conductive first element situated within a first channel of a first electrical shield. The method also comprises inducing a second current in an electrically conductive second element situated within a second channel of a second electrical shield, the second channel facing the first channel, and the second element separated from the first element by an airgap such that the first element is not physically coupled to the second element. The method further comprises translating the second current to digital data.

Those of ordinary skill in the art will appreciate still other aspects of the present application upon reading and understanding the appended description.

FIGURES

The application is illustrated by way of example and not limitation in the figures of the accompanying drawings, in which like references indicate similar elements and in which.

DESCRIPTION

Figure 1:
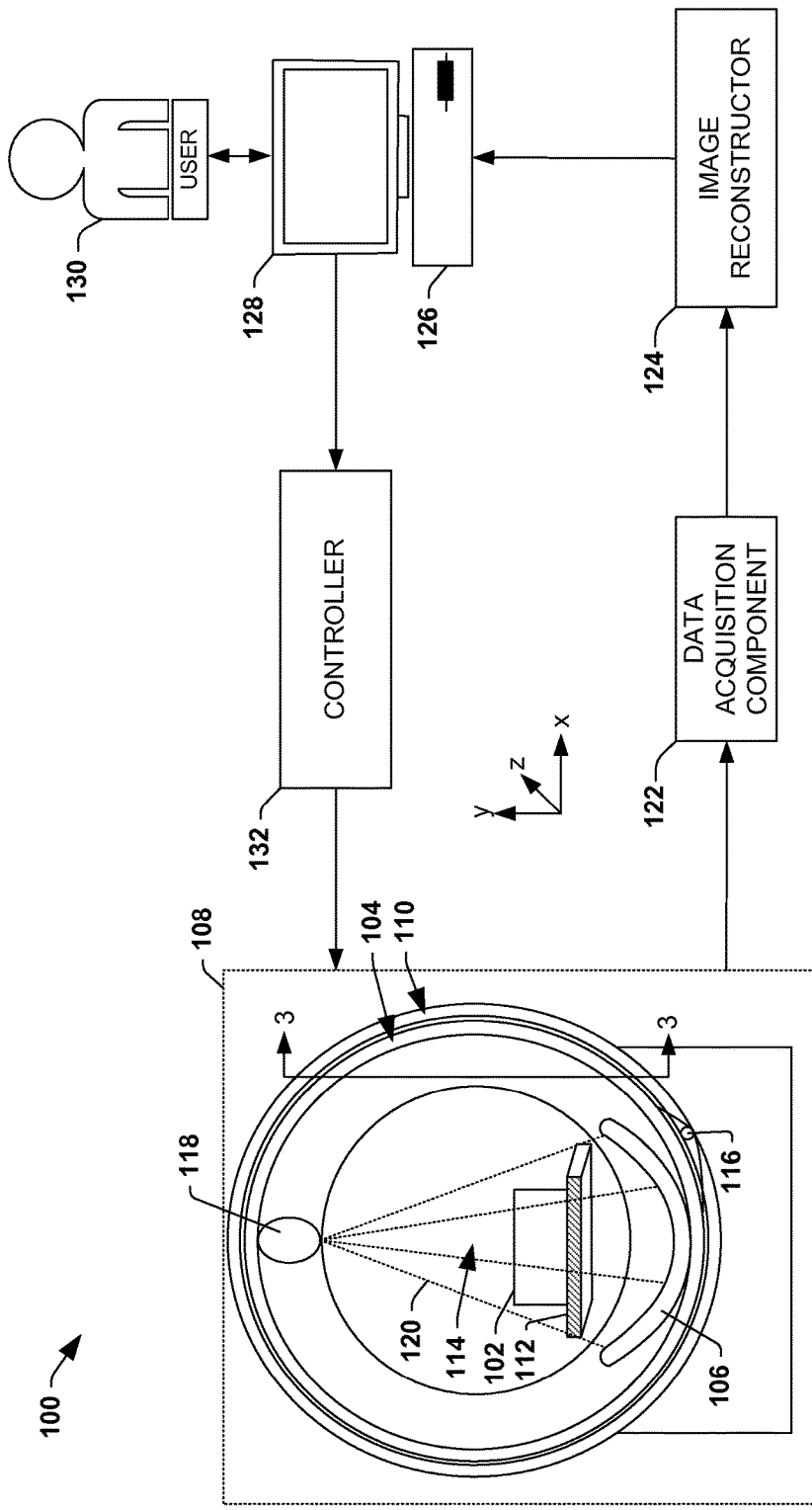
FIG. 1 is a schematic block diagram illustrating an example environment where an air-gap transmission system such as described herein may be implemented.

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are illustrated in block diagram form in order to facilitate describing the claimed subject matter.

The present disclosure relates to a serial point-to-point communication link for transferring signals (e.g., communication information) between a transmitter and a receiver separated by an airgap. The communication link is intended to substantially emulate a wired connection and to perform low latency transfers of asynchronous digital signals (e.g., although synchronous transfers of signals are also contemplated). The communication link comprises two transmissions lines, one of which serves as an input coupler and the other which serves as an output coupler. Respective transmission lines (e.g., also referred to herein as elements or wires) are placed in a channel or groove of an electrically conductive member (e.g., or a substantially dielectric member that comprises at least some electrically conductive portion). The proximity of respective transmission lines to their respective electrically conductive member may cause a capacitance of respective transmission lines to their members to be relatively large. Moreover, respective electrically conductive members may act as a shield for their respective transmission lines, reducing an effective inductance of the transmission lines. Given the high capacitance and the reduced inductance of respective transition lines, the lines may also have a low characteristic impedance (e.g., preferably less than 100 Ohms), for example.

Digital data is converted to a direct current (DC) analog signal (e.g., where a voltage characteristic of the signal is indicative of the data) at a transmitter and at least a portion of the analog signal is feed through a first transmission line (e.g., input coupler). When a first transmission line is placed approximate a second transmission line (e.g., output coupler) (e.g., such that the input coupler is facing the output coupler and vice-versa), a current of the signal flowing through the first transmission line may induce a current, in the second transmission line. The voltage characteristic of the signal feed through the first transmission line may be substantially the same as a voltage characteristic of the induced electric signal and may be used to reconstruct the digital input from which the first signal was yielded. Moreover, the coupling between the two transmission lines may be substantially independent of frequency and is mostly insensitive to external electromagnetic waves. In this way, there may be little to no compensation for frequency variability in signals transmitted between the transmission lines, for example.

Note that "noncontact," "contactless," and/or the like is used herein to refer to the ability to transfer information in inductive fashion between or among bodies configured for relative movement, and should not be understood to necessarily preclude possible contact between or among such bodies for other purposes, including, for example, electrostatic discharge, exchange or transmission of data, mechanical drive or support, braking and safety mechanisms, low-voltage power transfer, and/or high-voltage power transfer, etc.

It should also be noted that in the present disclosure, except where otherwise clear from context, "gap" and "air-gap" are used more or less interchangeably; although "air-gap" may be used herein, as this should be understood to be mere deference to convention, it should be understood that such gaps are not limited to air, it being possible for vacuum, oil, and/or other fluid and/or gas, and/or sliding and/or roller bearings or other such contrivances permitting relative movement to completely or partially fill such spaces.

FIG. 1 is an illustration of an example environment 100 where a serial point-to-point contactless communication link (e.g., also referred to herein as an air-gap transmission system) may be useful. More particular, FIG. 1 illustrates an example computed tomography (CT) apparatus that can be configured to acquire volumetric information regarding an object 102 under examination and generate two-dimensional and/or three-dimensional images therefrom.

It will be appreciated that while a CT apparatus is described herein, the instant application is not intended to be so limited. That is, to the extent practical, the instant application, including the scope of the claimed subject matter, is intended to be applicable to other apparatuses that comprise a movable unit (e.g., such as a rotor) and a stationary unit (e.g., a stator) and/or two movable units. More particularly, the instant application is applicable to other apparatuses where supplying communication information (e.g., control information, imaging information, etc.) to a movable portion of the apparatus, or to electronic components comprised therein, would be useful. Moreover, the example environment 100 merely illustrates an example schematic and is not intended to be interpreted in a limiting manner, such as necessarily specifying the location, inclusion, and/or relative arrangement of the components described herein. For example, a data acquisition component 122 as illustrated in FIG. 1 may be part of a rotor 104 portion of an object examination apparatus 108, or more particularly may be part of a detector array 106, for example.

In the example environment 100, the object examination apparatus 108 is configured to examine one or more objects 102 (e.g., a series of suitcases at an airport, a human patient, etc.). The object examination apparatus 108 can comprise a rotor 104 and a stator 110. During an examination of the object(s) 102, the object(s) 102 can be placed on a support article 112, such as a bed or conveyor belt, that is selectively positioned in an examination region 114 (e.g., a hollow bore in the rotor 104), and the rotor 104 can be rotated about the object(s) 102 by a rotator 116 (e.g., motor, drive shaft, chain, etc.).

The rotor 104 may surround a portion of the examination region 114 and may comprise one or more radiation sources 118 (e.g., an ionizing x-ray source) and a detector array 106 that is mounted on a substantially diametrically opposite side of the rotor 104 relative to the radiation source(s) 118. As will be described in more detail below, instructions and/or other communications to components physically coupled to the rotor 104 such as the radiation source 118 and/or detector array 106 may be transmitted via a communication link, where an input coupler (e.g., a first transmission line or electrically conductive first element) may be located along the stator and an output coupler (e.g., a second transmission line or electrically conductive second element) may be located along the rotor, for example.

During an examination of the object(s) 102, the radiation source(s) 118 emits fan, cone, wedge, and/or other shaped radiation 120 configurations into the examination region 114 of the object examination apparatus 108. It will be appreciated that such radiation may be emitted substantially continuously and/or may be emitted intermittently (e.g., a short pulse of radiation is emitted followed by a resting period during which the source is not activated).

As the emitted radiation 120 traverses the object(s) 102, the radiation 120 may be attenuated differently by different aspects of the object(s) 102. Because different aspects attenuate different percentages of the radiation 120, an image(s) may be generated based upon the attenuation, or variations in the number of radiation photons that are detected by the detector array 106. For example, more dense aspects of the object(s) 102, such as a bone or metal plate, may attenuate more of the radiation 120 (e.g., causing fewer photons to be detected by the detector array 106) than less dense aspects, such as skin or clothing.

The detector array 106 is configured to directly convert (e.g., using amorphous selenium and/or other direct conversion materials) and/or indirectly convert (e.g., using photodetectors and/or other indirect conversion materials) detected radiation into signals that can be transmitted from the detector array 106 to a data acquisition component 122 configured to compile signals that were transmitted within a predetermined time interval, or measurement interval, using certain techniques (e.g., integration, photon counting, etc.). It will be appreciated that such a measurement interval may be referred to as a "view" and generally reflects signals generated from radiation 120 that was emitted while the radiation source 118 was at a particular angular range relative to the object 102. Based upon the compiled signals, the data acquisition component 122 can generate projection data indicative of the compiled signals, for example.

The example environment 100 further comprises an image reconstructor 124 configured to receive the projection data that is output by the data acquisition component 122. The image reconstructor 124 is configured to generate image data from the projection data using a suitable analytical, iterative, and/or other reconstruction technique (e.g., back-projection reconstruction, tomosynthesis reconstruction, iterative reconstruction, etc.). In this way, the data is converted from projection space to image space, a domain that may be more understandable by a user 130 viewing the image(s), for example.

The example environment 100 also includes a terminal 126, or workstation (e.g., a computer), configured to receive the image(s), which can be displayed on a monitor 128 to the user 130 (e.g., security personnel, medical personnel, etc.). In this way, a user 130 can inspect the image(s) to identify areas of interest within the object(s) 102. The terminal 126 can also be configured to receive user input which can direct operations of the object examination apparatus 108 (e.g., a speed to rotate, a speed of a conveyor belt, etc.).

In the example environment 100, a controller 132 is operably coupled to the terminal 126. In one example, the controller 132 is configured to receive input from the terminal 126, such as user input for example, and to generate instructions for the object examination apparatus 108 indicative of operations to be performed. For example, the user 130 may desire to reexamine the object(s) 102 at a different energy level, and the controller 132 may issue a command instructing the support article 112 to reverse direction (e.g., bringing the object(s) 102 back into an examination region 114 of the object examination apparatus 102) and instructing a power supply located within the rotor to increase a voltage applied to the radiation source (e.g., causing the radiation output therefrom to have a higher energy).

As will be described in more detail below, commands and/or other information that is transmitted between components physically attached to the rotor 104 (e.g., such as the radiation source 118 and/or detector array 106) and communication components that are not physically attached to the rotor 104 (e.g., such as the controller 132) may be transmitted through an air-gap transmission system. More particularly, the commands and/or other information may be transmitted between the stator 110 and the rotor 104 via electrically conductive elements (e.g., such as electrical wire) respectively positioned within a channel of the rotor 104 and the stator 110. For example, an electrically conductive first element may be inserted into a channel of the stator 110 and may act as an input coupler (e.g., for transmitting information) while an electrically conductive second element positioned in a channel of the rotor 104 may act as an output coupler (e.g., for receiving information from the input coupler).

Figure 2:
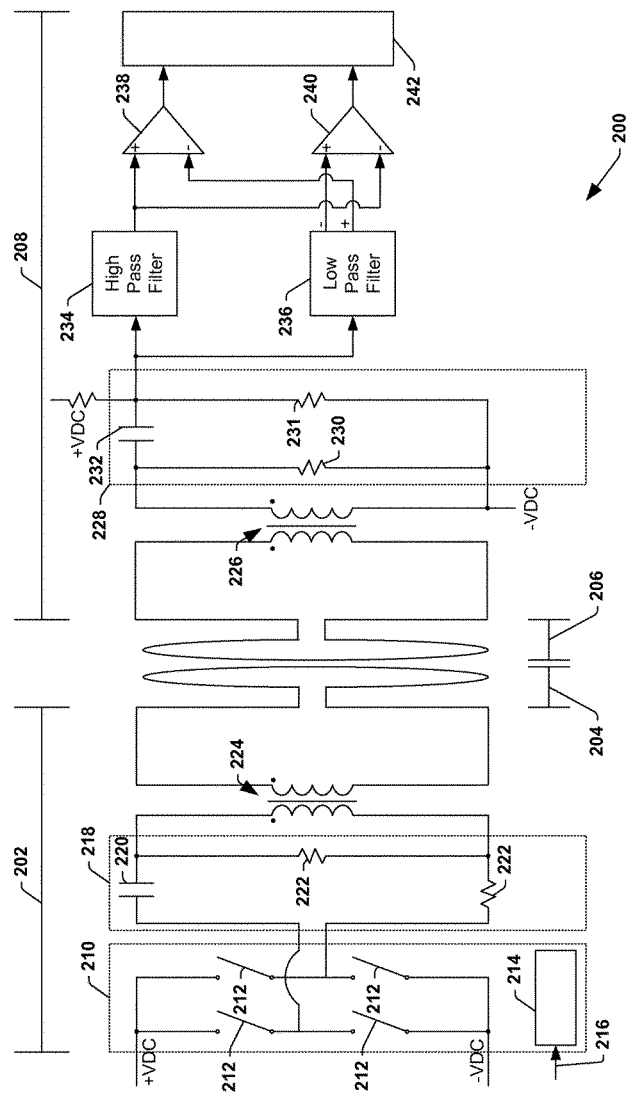
FIG. 2 illustrates a circuit schematic of an example air-gap transmission system.

FIG. 2 illustrates an example circuit schematic 200 of an air-gap transmission system whereby communication information may be transferred between a movable (e.g., rotating) unit and a stationary unit and/or between two movable units, for example via an airgap. It will be appreciated that the illustrated circuit schematic 200 is merely intended to describe one example arrangement of a circuit that may be utilized for communicating information over an airgap when a transmitter and/or receiver is moving (e.g., rotating). That is, the instant disclosure is not intended to be limited to such an embodiment. For example, in another embodiment, filters 234, 236 comparators 238, 240 and/or programmable device 242 may be replaced by an A/D converter and a digital system processor and/or microprocessor, for example.

The example air-gap transmission system may be divided into four portions for ease of description, a transmitter portion 202, an input coupler 204, an output coupler 206, and a receiver portion 208. The input coupler 204 and the output coupler 206 will be described in more detail with respect to FIGS. 3-6. Thus, the description accompanying FIG. 2 will be focused on the transmitter portion 202 and the receiver portion 208. However, it should be noted that the input coupler 204 and the output coupler 206 are typically in close spatial proximity (e.g., 20 mm or less) and may be comprised of virtually any electrically conductive material (e.g., including, but not limited to, a copper and/or aluminum wire).

Further, it will be appreciated that while continued reference may be made herein to the transmitting portion 202 and the input coupler 204 (e.g., collectively of which may be referred to as the transmitter) being located on a stationary unit, such a stator of a CT imaging modality (e.g., 110 in FIG. 1), the transmitter may instead be located on a movable unit, such as a rotor of a CT imaging modality (e.g., 104 in FIG. 1). Similarly, the output coupler 206 and the receiver portion 208 (e.g., collectively of which may be referred to as the receiver) may be located on a movable unit and/or on a stationary unit, for example. Moreover, where bi-directional communication is preferred, the stationary unit may comprise both a transmitter and a receiver and the movable unit may comprise both a transmitter and a receiver, for example (e.g., as further illustrated in FIG. 6).

The transmitting portion 202 comprises a full bridge circuit 210, or an H bridge, comprising a plurality of switches 212 arranged in an "H" configuration and a bridge control 214 configured to control the plurality of switches 212. Commands and/or other digital data that is transmitted to the transmitting portion 202 (e.g., such as from the controller 132 in FIG. 1) may be received 216 by the bridge control 214. Using the received digital data, the bridge control 214 may manipulate one or more of the switches 212 to generate a direct current analog signal comprising a voltage characteristic that is indicative of the digital signal received by the bridge control 214, for example.

The analog signal(s) output by the full bridge circuit 210 may be received by a differentiator circuit 218 comprising a capacitor 220 and a series of resistors 222, for example. The differentiator circuit 218 is configured to output a direct current analog signal comprising a voltage characteristic that is proportional to a rate of change of a voltage characteristic of the signal input into the differentiator circuit 218. That is, stated differently, the differentiator circuit 218 identifies voltage edges (e.g., rising edges and falling edges) of the voltage characteristic of the analog signal output by the full bridge circuit 210. The signal output by the differentiator circuit 218 is indicative of these edges. Thus, suppose that between 0 and 1 seconds a voltage of the input signal is 0 V, between 1 and 5 seconds a voltage of the input signal is 20 V, and between 5 and 10 seconds the voltage of the input signal is 0 V. The analog signal output by the differentiator circuit 212 may show a rise in the voltage at the 1 second mark and a drop in the voltage at the 5 second mark. However, the voltage of the output signal indicative of the timespan between 1 and 5 seconds may be substantially 0 V (e.g., or whatever the baseline voltage may be) because there is no change in the voltage during this time span. Thus, the output of the differentiator circuit 218 may be an analog signal with a voltage characteristic that indicates changes in the voltage characteristic of a signal received by the differentiator circuit 218 from the full bridge circuit 210, for example.

The transmitter portion 202 also comprises a first transformer 224 comprising one or more primary windings and one or more secondary windings. Together, such windings may convert or change the impedance of a load. Stated differently, the number of primary windings and/or secondary windings may be independently increased or decreased to increase or decrease the impedance of the load until a desired impedance is achieved. The desired impedance may differ by application, but in at least one embodiment, it is preferred that the impedance of the signal output by the differentiator circuit 218 be matched to an impedance of a signal flowing through the input coupler 204, for example. In this way, the transmitter may operate at an improved (e.g., maximum) efficiency and the amount of power converted into undesired heat by the transmitter may be reduced (e.g., minimized). In another embodiment, the impedance of the load may be adjusted to reduced (e.g., minimize) signal reflections (e.g., to reduce frequency dependencies of the signal transfer from the transmitter to the receiver). It will be appreciated that such a transformer may be referred to as a "matching transformer" because it is configured to match an impedance of the signal flowing through its primary and secondary windings.

The DC analog signal induced on the second winding of the transformer 224 is passed through the input coupler 204, creating an electro-magnetic field (e.g., also referred to herein as an electric field). Given that the input coupler 204 and the output coupler 206 are in close spatial proximity (e.g., they are separated by 20 mm or less, but preferably less than 10 mm apart), at least some of the electric field generated by current flowing through the input coupler 204 induces a current in the output coupler 206. In this way, in essence, the input coupler 204 and the output coupler 206 behave akin to a transformer, for example. The voltage of the signal flowing through the input coupler 204 and the voltage of the signal induced on the output coupler 206 preferably correspond to one another, although there might by some deviations between the voltages due to attenuation of the signal by the output coupler 206, for example. In this way, the voltage edges are transferred from the input coupler 204 to the output coupler 206.

As illustrated, the signal induced on the output coupler 206 is transmitted to a second transformer 226 comprising one or more primary windings and one or more secondary windings. Like the first transformer 224, the second transformer 226 may be configured to adjust the impedance of the load to achieve a desired impedance. In this way, signal reflections in the signal may be reduced to reduce frequency dependencies of the signal, for example.

The signal output by the second transformer 226 is output to a circuit 228, which may form a first stage of a high pass filter 234, for example. The circuit 228 comprises a termination resistor 230 configured to reduce (e.g., minimize) signal reflections, for example. The circuit 228 also comprises an AC coupling capacitor 232 and another resistor 231 that is part of a voltage divider (e.g., along with the termination resistor 230) and is configured to set a bias voltage for the high pass filter 234 and/or the low pass filter 236, for example.

The signal output by the circuit 228 is transmitted to a high pass filter 234 and a low pass filter 236 configured to filter out portions of the signal having one or more undesirable frequencies. More specifically, while the input and output couplers 204, 206 are designed to block out some interference from other components of the stationary and/or movable units, noise may be contributed to the signals passing through the couplers 204, 206. By way of example, a contactless power transfer system (e.g., within relatively close proximity to couplers 204 and/or 206) configured to feed power to the movable unit, for example, may emit signals in a similar frequency range as signals of the air-gap transmission system (e.g., which may operate at frequencies between 100 kHz and 50 MHz), but may output more power (e.g., potentially causing interference with the signals of the air-gap transmission system, particularly if the input coupler 204 and/or the output coupler 206 are not properly shielded as described below). Thus, in some embodiments, a portion the power signals may interfere with air-gap signals and it may be desirable to filter out signals that may otherwise be imparted from the power transfer system to the air-gap transmission system (e.g., 204 and/or 206), for example. Moreover, it may be appreciated that interference from such power signals may be further reduced via the matching transformers 224, 226 because a relatively low characteristic impedance of the signals passing through the air-gap transmission system reduces effects of a capacitive coupling with the power system, for example.

The example circuit schematic 200 further illustrates two voltage comparators 238 and 240 respectively configured to compare the voltage of the signal output by the circuit 228 to voltage of a reference signal and to output an indication of which signal comprises a larger voltage. Here, the reference signal of a first comparator 238 is provided by the high pass filter 234 and the first comparator 238 is configured to find a rising voltage edge (e.g., a positive edge). The reference signal of the second comparator 240 is provided by the low pass filter 236 and the second comparator 240 is configured to find a falling voltage edge (e.g., a negative edge).

Based upon the output of the comparators 238, 240, a digital filter 242 is configured to reconstruct the digital data. Stated differently, the digital filter 242 is configured to use the identification of the rising voltage edges and the falling voltage edges and digital signal reconstruction techniques to substantially reconstruct that data that was received at 216.

That is, in FIG. 2, a digital input signal is received 216 at a transmitting inverter (e.g., the full bridge circuit 210). A switching signal produced by the transmitting inverter is configured to create a current that is passed through the input coupler 204 via the differentiation circuit 218 and the (matching) transformer 224. On the receiving side, a current is induced on the output coupler 206 via the current flowing through the input coupler 204. The induced current is shaped into a pulse via the (matching) transformer 226, the termination resistor 230, and the filters 234, 236. The pulse is transmitted to at least two comparators 238, 240 (e.g., which may comprise hysteresis). A first comparator 238 is set to identify signals having a higher voltage than a first specified threshold (e.g., a high threshold) and the second comparator 240 is configured to identify signals having a lower voltage than a second specified threshold (e.g., a low threshold). The difference between the first and second specified thresholds may, for example, define a level of noise immunity (e.g., which may allow the circuit to operate in a hostile environment with not an insignificant or inconsequential amount of noise). Signals from the comparators 238, 240 are transmitted to the digital filter 242 (e.g., or a resampling circuit) configured to detect a voltage level of the signal relative to time, which can be used to reconstruct the digital input signal, for example.

Figure 3:
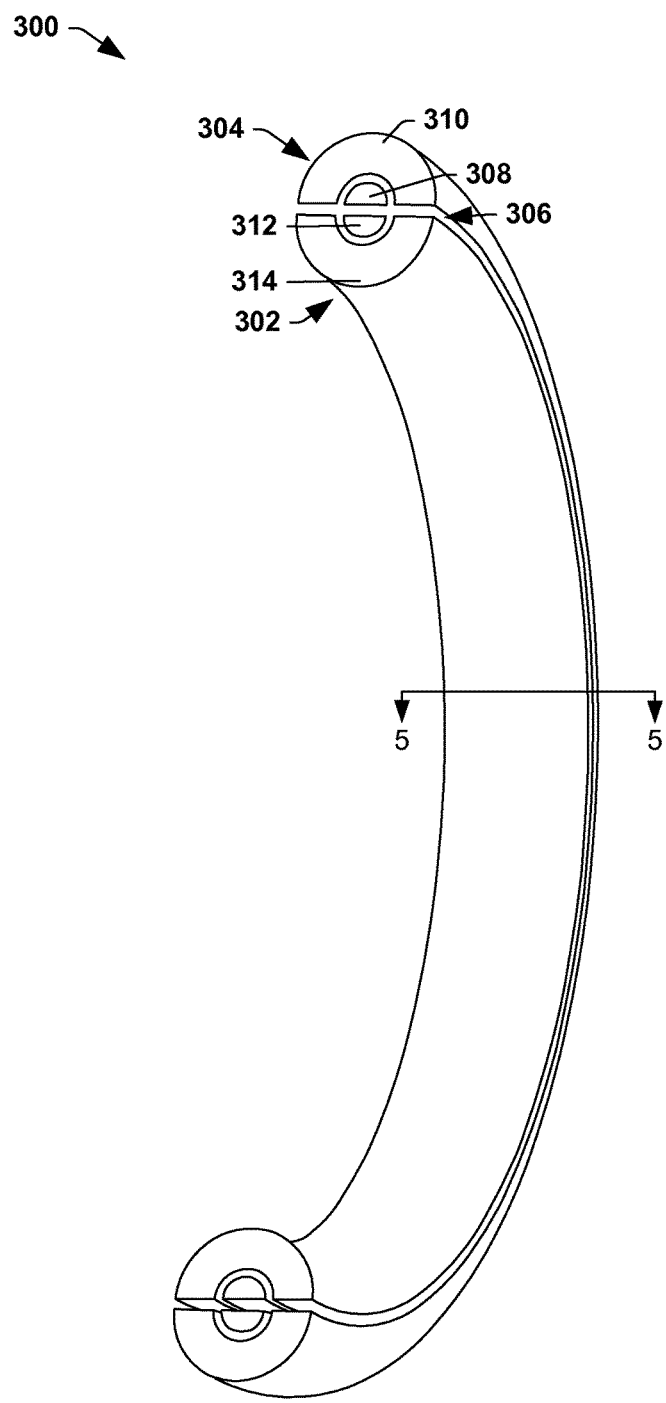
FIG. 3 illustrates an example stator comprising an input coupler for transmitting information and an example rotor comprising an output coupler for receiving the transmitted information.

FIG. 3 illustrates a cross-sectional view (e.g., taken along line 3-3 in FIG. 1) of a coupler portion 300 of an air-gap transmission system (e.g., illustrated by the circuit schematic 200 in FIG. 2). The coupler portion 300 comprises a rotor 302 (e.g., 104 in FIG. 1) and a stator 304 (e.g., 110 in FIG. 1). More particularly, the coupler portion 300 of the air-gap transmission system is comprised of electrically conductive elements 308, 312 positioned within respective channels of the rotor 302 and the stator 304. However, the rotor 302 and the stator 304 may act as shields for the elements 308, 312 and thus may be considered to be part of the coupler even though the elements 308, 312 are performing the transmitting and/or receiving.

As illustrated herein, the rotor 302 and the stator 304 are respectively half circles separated from one another via an airgap 306, and as will be described below, communications information is configured to be transferred between the stator 304 to the rotor 302 through the airgap 306. In this way, communication information may be supplied to electrical components comprised within the rotor 302, such as a radiation source (e.g., 118 in FIG. 1), a detector array (e.g., 106 in FIG. 1), and/or control components for controlling the radiation source and/or the detector array while reducing and/or mitigating the use of slip-rings and/or brushes, for example.

The rotor 302 and the stator 304 respectively comprise two coaxial half-shells or layers. For example, the stator 304 comprises, being in order from the airgap 306, an electrically conductive first element 308 (e.g., a first electrically conductive wire) and an electrically conductive first member 310. As will be described in more detail below, at least a portion of the first member 310 is configured to act as a shield when a current flows through the electrically conductive first element 308. Similarly, the rotor 302 comprises, being in order from the airgap 306, an electrically conductive second element 312 (e.g., a second electrically conductive wire physically unattached to the first electrically conductive wire) and an electrically conductive second member 314 (e.g., which may also act as a shield and may be circularly symmetric with the first member 310). It will be appreciated that between the respective layers, there may be gaps of indeterminate thickness (e.g., intended to include the possibility of zero gap). Such gaps may be filled with air, gases, epoxies, and/or other materials. However, typically at least a portion of the gap comprises a dielectric material configured to electrically isolate the members 310, 314 from their respective elements 308, 312. Thus, as will be described in more detail below, a portion of respective elements 308, 312 may be coated and/or enclosed by a dielectric material, for example.

Note that as used herein, "half-shell," half-circle," and/or the like are used as shorthand to refer to one of multiple (e.g., two) parts making up a whole constituting an inductive couple, shell, or the like, and as such should not be interpreted overly literally to mean that there must be exactly two such components and/or that such components must be of equal size, volume, mass, or the like; nor should a similar implication be drawn from use of "couple" (e.g., that there must be exactly two such components). Rather, as used herein, except where otherwise clear from context, such terms should be understood to be representative of the more general case in which multiple parts may make up such a whole. Furthermore, with respect to half-shells, for example, the prefix "half-" may sometimes be omitted for convenience of description.

Figure 4:
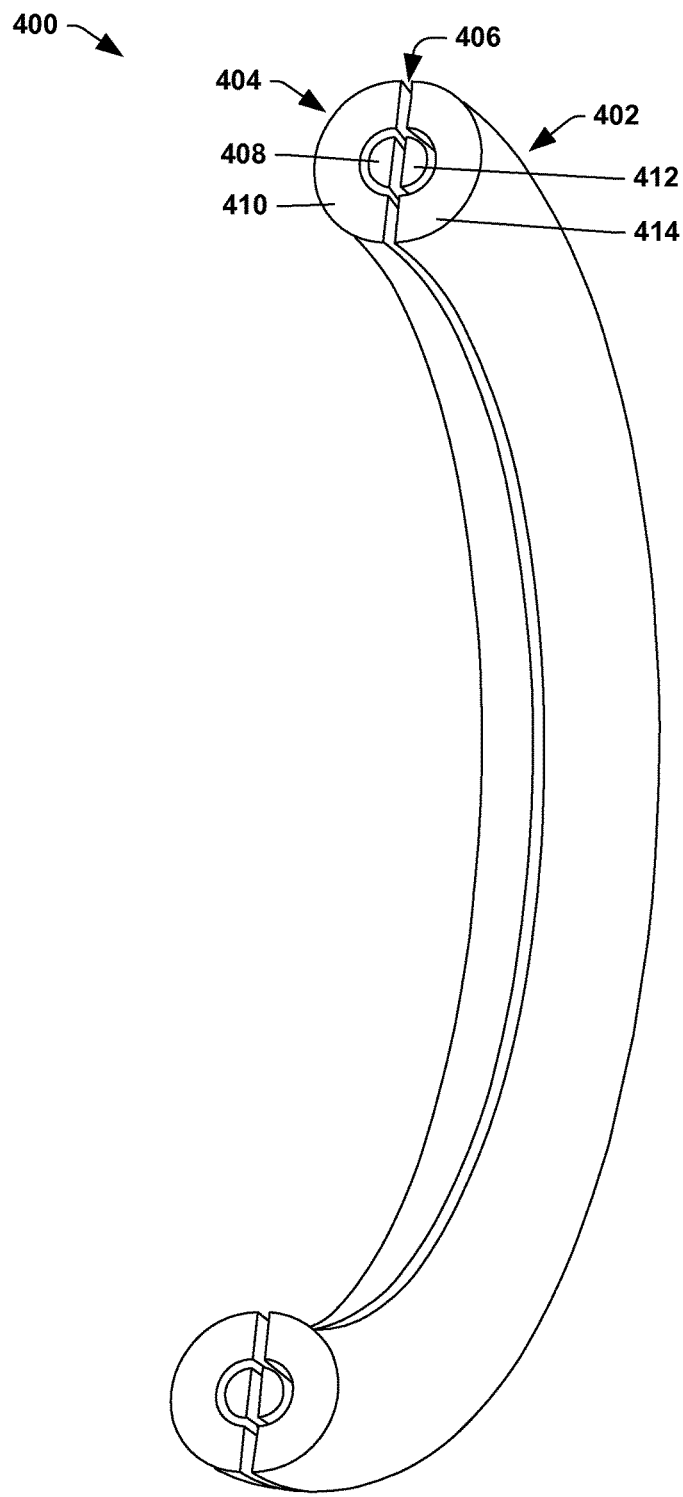
FIG. 4 illustrates an example stator comprising an input coupler for transmitting information and an example rotor comprising an output coupler for receiving the transmitted information.

FIG. 4 illustrates a cross-sectional view of another embodiment of a coupler portion 400 of an air-gap transmission system, where a rotor 402 (e.g., 104 in FIG. 1) and a stator 404 (e.g., 110 in FIG. 1) are separated by a planar (e.g., as opposed to cylindrical) airgap 406. Like FIG. 3, the rotor 402 and the stator 404 respectively comprise two coaxial half-shells or layers. For example, the stator 404 comprises, being in order from an airgap 406, an electrically conductive first element 408 and an electrically conductive first member 410, and the rotor 402 comprises, being in order from the airgap 406, an electrically conductive second element 412 and an electrically conductive second member 414. Between the respective layers, there may be gaps of indeterminate thickness (e.g., intended to include the possibility of zero gap) comprising a gas (e.g., such as air) and/or a dielectric material, for example.

It will be appreciated that FIGS. 3-4 are merely intended to illustrate example configurations for the rotor 302, 402 and for the stator 304, 404, and that other configurations are contemplated. Moreover, while FIGS. 3-4 illustrate substantially cylindrical and planar airgaps 306, 406, respectively, it will be appreciated that the angle of the airgap may differ from the embodiments herein illustrated. For example, in another embodiment, the airgap could be conical (e.g., where a cylindrical airgap would have a cone angle of substantially zero and a planar airgap would have a cone angle of substantially 180°).

Figure 5:
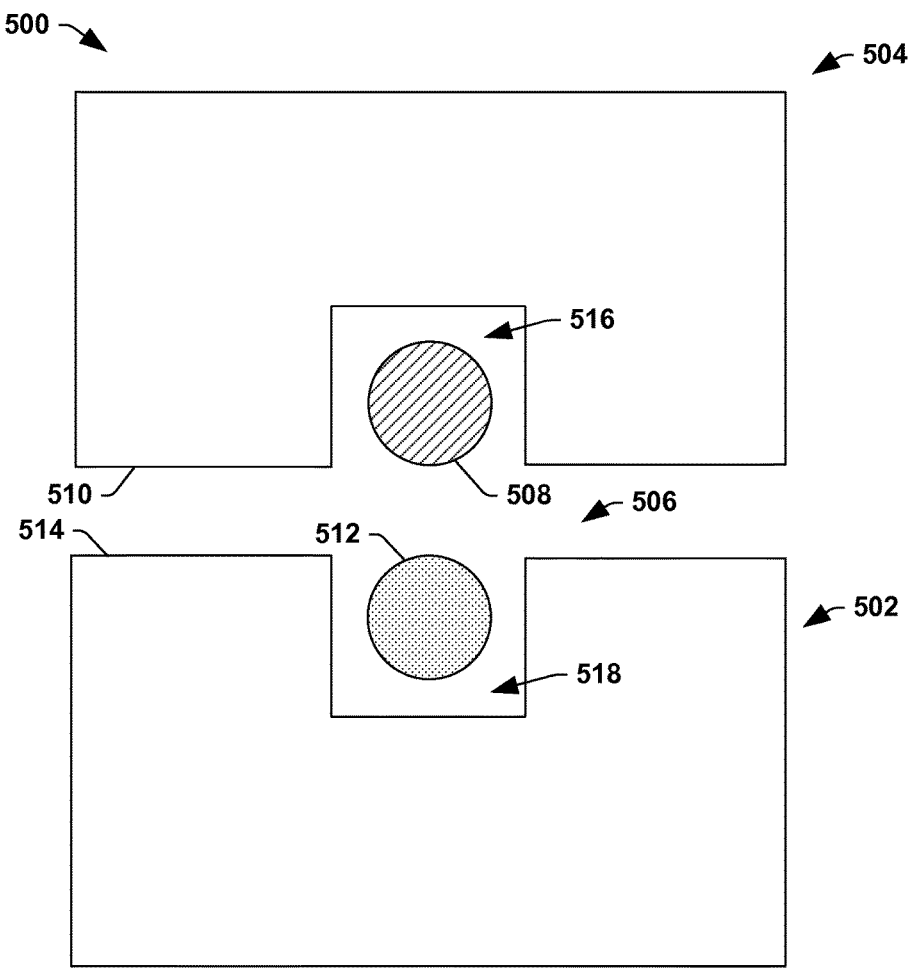
FIG. 5 illustrates a cross-section of an example stator comprising an input coupler for transmitting information and an example rotor comprising an output coupler for receiving the transmitted information.

Referring now to FIG. 5, a cross-sectional view 500 (e.g., taken along line 5-5 in FIG. 3) of a rotor 502 (e.g., 302 in FIG. 3) and a stator 504 (e.g., 304 in FIG. 3) is illustrated. As described above, the stator 504 comprises, being in order from an airgap 506, an electrically conductive first element 508 and an electrically conductive first member 510. For reasons that will be described later (e.g., pertaining to shielding), the first member 510 typically comprises a first channel 516, and the first element 508 is positioned within the first channel 516. Moreover, although not illustrated, one or more substantially dielectric materials (e.g., insulators) may be positioned between the first member 510 and the first element 508 and may partially enclose and/or surround the first element 508 (e.g., leaving merely a portion of the first element 508 facing a second element 512 exposed). At least partially enclosing the first element 508 (or the second element 512) with a dielectric material(s) may have numerous benefits, including reducing/mitigating parasitic current loops and/or leakages that may cause current to be transferred from the first element 508 to the first member 510, for example. Moreover, the dielectric material(s) may reduce and/or mitigate cross-talk and/or noise interference caused by other components situated proximate the stator 504 and/or the rotor 502 (e.g., such as from a power-link and/or other communication antennas).

Like the stator 504, the rotor 502 comprises, being in order from the airgap 506, an electrically conductive second element 512 and an electrically conductive second member 514. Moreover, like the first member 510, the second member typically comprises a second channel 518, and the second element 512 is positioned within the second channel 518. A substantially dielectric material(s) (not illustrated) may also be positioned between the second member 514 and the second element 512 and may partially enclose and/or surround the second element 512 (e.g., leaving merely a portion of the second element 512 facing the first element 508 exposed) to achieve benefits similar to those described above (e.g., including reducing/mitigating a flow of current from the second element 512 to the second member 514).

It will be appreciated that for purposes of this example and the other examples described herein, the transmitter of the communication information is located on and/or in operable communication with the stator 504 and the receiver of the communication information is located on and/or in operable communication with the rotor 502. That is, the stator 504 acts as an input coupler (e.g., for transmitting communication information (e.g., such as control data for controlling components comprised on the rotor 502)) and the rotor 502 acts as an output coupler (e.g., for receiving the transmitted information).

In this embodiment, where the stator 504 acts as an input coupler, end points of the first element 508 may be connected to a transmitter configured to generate a first current flow in the first element 508. Characteristics of the signal flowing through the first element 508, such an amount of current, a voltage of the signal, etc., may be a function of the communication information that is intended to be transferred from the stator 504 to the rotor 502. That is, the transmitter, for example, may receive digital communication information and may translate the digital communication information into a direct current analog signal having properties representative of the digital communication information (e.g., which the receiver may translate back into digital communication information).

It will be appreciated that the first element 508 may be comprised of substantially any material sufficient to support the current output by the transmitter. For example, the first element may be comprised of an electrically conductive wire, such as a cooper wire and/or an aluminum wire. Moreover, in one embodiment, the wire may be braided or stranded to reduce and/or mitigate effects on the signal should the wire be inadvertently damaged and/or to improve characteristic impedance (e.g., to reduce the impedance of the wire), for example. Although not illustrated in this embodiment, in another embodiment (e.g., such as the embodiment illustrated in FIG. 6), the first element 508 may also comprise at least one substantially flat surface. For example, a surface facing the second element 512 (e.g., or facing the second channel 518) may be substantially flat to improve (e.g., maximize) an intensity of the electric field (e.g., in the direction of the second element 512) generated by the current flowing through the first element 508. A flat surface of the first element 508 and/or a flat surface of a second element 512 may also increase the capacitive coupling effect of the two elements 508, 512 (e.g., causing a characteristic coupling impedance to be reduced).

Current flowing through the first element 508 generates an electric field, which may induce a second current (e.g., an induced current) in the second element 512. That is, when the first element 508 and the second element 512 are in close spatial proximity (e.g., typically 20 mm or less, but preferably 5 mm or less), an electric field produced by current flowing through the first element 508 may induce a current flow in the second element 512. Typically, the signal that is induced by the electric field comprises characteristics that are similar to the characteristics of the signal flowing through the first element 508. For example, although the voltage of the induced signal may differ from the voltage of the signal flowing through the first element 508 due to attenuation, for example, the voltage may indicate similar rises and drops (e.g., the voltage edges of the signal flowing through the first element 508 are apparent in the induced signal). In this way, characteristics of the induced signal, including voltage characteristics, may be utilized to derive digital communication information by the receiver, for example.

The second element 512 is comprised of one or more materials configured to support the induced current. For example, the second element 512 may be comprised of electrically conductive braided and/or solid wire and/or may have attributes described with respect to the first element 508. Moreover, a surface of the second element 512 facing the first element 508 (e.g., or the first channel 516) may be substantially flat to increase an amount of the electric field that is detected and/or absorbed by the second element 512 to induce the current therein, for example.

To reduce and/or mitigate the escape of radiation yielded from the electric field (e.g., which may interfere with sensitive imaging equipment, for example), the first and second members 510 and 514 may be configured to support a current that produces an electric field substantially sufficient to cancel magnetic flux yielded from an electric field produced by currents flowing through the first and/or second elements 508, 512. That is, stated differently, Maxwell's equations predict than an oscillating magnetic field (e.g., generated by current flowing in the first and/or second elements 508, 512) will respectively induce electric currents in the first and/or second members 510, 514. These induced currents in the first and/or second members 510, 514 may flow in the same direction and may be substantially equal in magnitude but are typically opposite in sign to the current in the first and second elements 508, 512. Thus, one or both of the members 510, 514 may be configured to carry a current capable of inducing an electric field that will mitigate (e.g., or cancel) the electric field due to the net current in the first and second elements 508, 512. In this way, the first and second members 510, 514 may be configured to act as shields that prevent and/or mitigate the escape of radiation beyond the airgap 506 (e.g., where the radiation may cause interference or other deleterious effects with associated, surrounding, etc. electrical components, for example).

Figure 6:
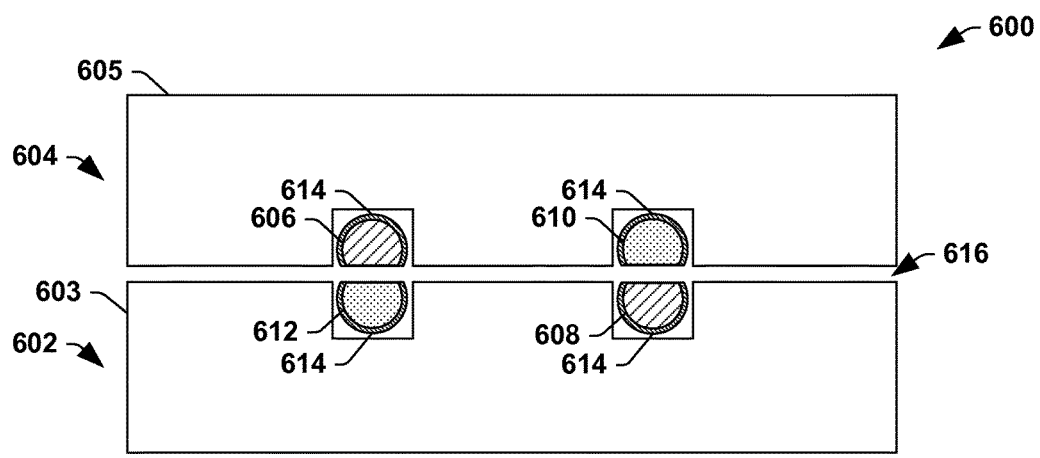
FIG. 6 illustrates a cross-section of an example stator comprising an input coupler for transmitting information and an example rotor comprising an output coupler for receiving the transmitted information.

FIG. 6 illustrates another example embodiment 600 showing a cross-section of an example rotor 602 and stator 604 (e.g., taken along line 5-5 in FIG. 3). More particularly, FIG. 6 illustrates an example embodiment 600 for bi-directional communication via an air-gap transmission system. The rotor 602 and the stator 604 respectively comprise a member 603, 605, and respective members 603, 605 comprise two electrically conductive elements, or wires. One element 606 of the stator 604 and one element 608 of the rotor 602 are treated as input couplers (e.g., respectively represented by hashed semi-circles). The rotor 602 and the stator 604 also respectively comprise output couplers 612, 610 (e.g., respectively represented by the dotted semi-circles) configured to have a current induced therein. More particularly, the input coupler 606 of the stator 604 is configured to induce a current in the output coupler 612 of the rotor 602 and the input coupler 608 of the rotor 602 is configured to induce a current in the output coupler 610 of the stator 604.

As described above and as illustrated in FIG. 6, a surface of one or more elements 606, 610, 612, 614 facing another element may be flat to improve conductivity between the elements (e.g., to increase a percentage of the signal that is transferred from the transmitting element to the receiving element). Moreover, respectively elements may be at least partially enclosed by a dielectric material 614 (e.g., represented by the shaded material) to mitigate the transfer of current to the members 603, 605 (e.g., which may be comprised of an electrically conductive material, such as aluminum) and/or to reduce electric noise that may interfere with the signal flowing through the element, for example.

Moreover, it will be appreciated that while continued reference is made herein to the members being comprised of an electrically conductive material, such as aluminum, for example, it will be appreciated that in one embodiment, merely a portion of the members 603, 605 may be electrically conductive and the rest of one or more members 603, 605 may be dielectric. By way of example, in one embodiment, a portion of one or both of the members 603, 605 spatially proximate an airgap 616 may be comprised of an electrically conductive material (e.g., such as a metal wire) to support field-cancelling currents, while the rest of one or both of the members 603, 605 may be comprised of a dielectric material, such as a plastic, for example.

As may be evident from FIGS. 5-6, it will be appreciated that there is little to no ferromagnetic material disposed between the elements and the channels that the respectively elements are positioned within. Ferromagnetic materials, such as ferrite are typically used to reduce and/or mitigate high frequency noise from entering and/or exiting a structure. However, in a one embodiment, the air-gap transmission system has a wide bandwidth (e.g., transferring information in the frequency range of about 100 kHz to about 50 MHz). Given this wide frequency range, it may be undesirable to include a ferrite material between elements and their respective channels, for example. Moreover, the lack of a ferrite material surrounding the elements conducting the electrical signals in the air-gap transmission system may reduce a magnetic coupling with a power transmission system if a power transmission system is adjacent or nearby the air-gap transmission system, for example.

Figure 7:
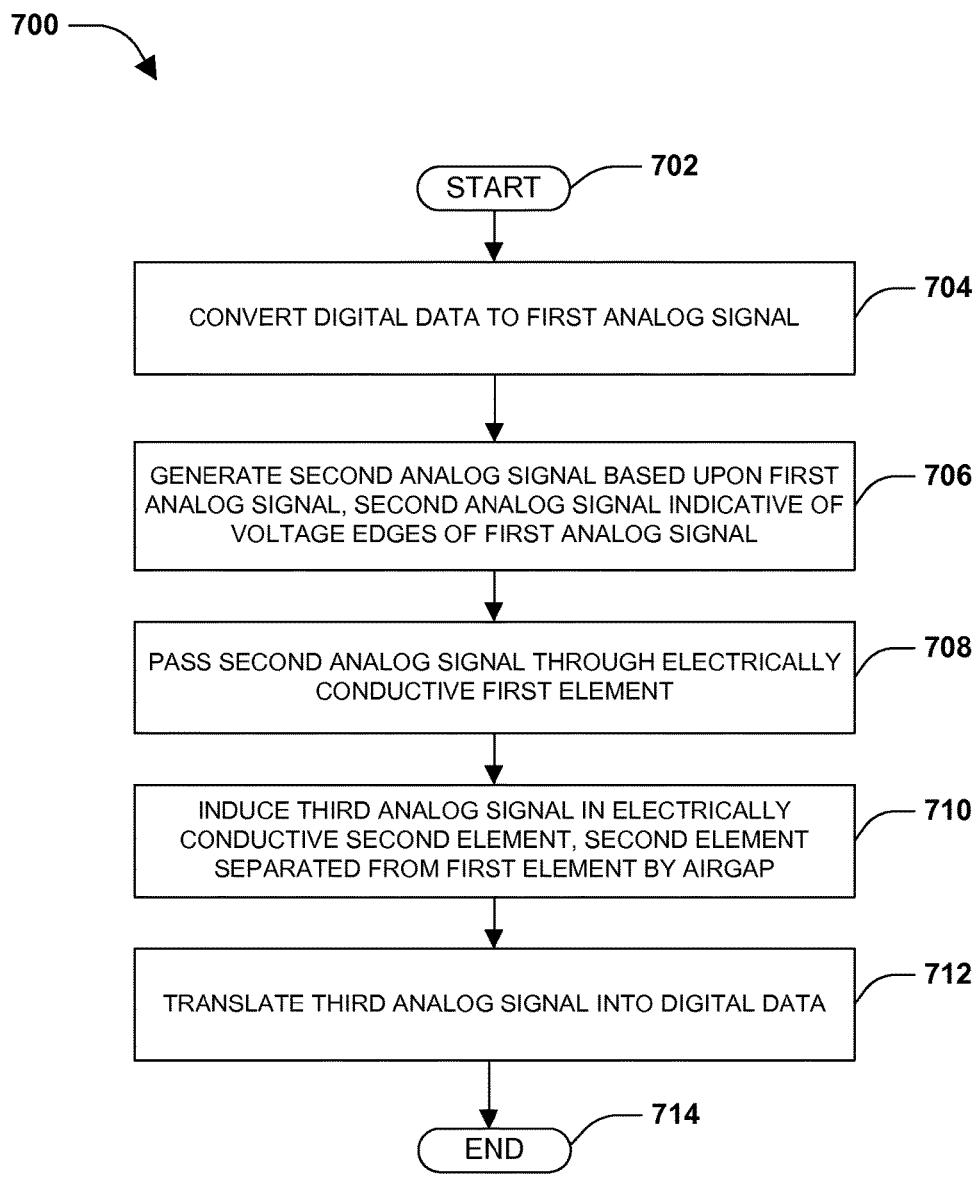
FIG. 7 is a flow diagram illustrating an example method of communicating information between a first apparatus and a second apparatus.

FIG. 7 illustrates an example method 700 for communicating information between a first apparatus (e.g., a stationary unit) and a second apparatus (e.g., a movable/moving/rotating unit). The method begins at 702, and a digital signal is converted to a DC analog signal at 704. By way of example, as illustrated in FIG. 2, an H bridge may be utilized to convert digital data received by a bridge controller to a DC signal. The voltage of the signal may be a function of information comprised in the digital data. That is, a voltage characteristic of the signal may be configured to carry or support the information comprised in the digital data.

In the example method 700, a second analog signal is generated based upon the first analog signal (e.g., using a differentiator circuit) at 706. The second analog signal may have characteristics similar to the first analog signal (e.g., a same current), but a voltage characteristic of the second analog may differ. For example, in one embodiment, the voltage characteristic of the second analog signal may be merely indicative of voltage edges (e.g., increases or decreases in the voltage) of the first analog signal. In this way, merely voltage edges may be transferred from an input coupler to an output coupler, for example (e.g., allowing high-throughput of information).

At 708 in the example method 700, the second analog signal is passed through an electrically conductive first element (e.g., an input coupler), such as a metal wire. As the signal is passing through the element, the current of the signal creates an electric field around the element. Using this electric field, a third analog signal may be induced in an electrically conductive second element facing the first element and spatially proximate to, but not in physical contact with, the first element. Typically, the first and second elements are separated by an airgap of less than 20 mm, although the airgap may be greater than 20 mm if the electric field generated by current flowing through the first element is large enough to reach more than 20 mm.

The electric field may also induce a current on an electrically conductive portion of a member supporting at least one of the first and second elements. If the electrically conductive portion of a member(s) is substantially continuous (e.g., such that the current induced therein can flow in a complete loop substantially unimpeded), the current flowing through the electrically conductive portion of the member(s) may create an electric field that substantially confines the electric field generated by current flowing through the first element (and/or second element) within the airgap. In this way, the leakage of the electric field to other components outside of the airgap may be reduced and/or mitigated, for example.

The third analog signal may comprise characteristics that substantially correspond to the characteristics of the second analog signal. For example, the third analog signal may comprise voltage edges that substantially match the voltage edges of the second analog signal (e.g., although that may vary somewhat in magnitude).

At 712 in the example method 700, the analog signal is translated into digital data 712 by a receiver. More particularly, the voltage edges of the signal are identified and are used to reconstruct the digital data that was converted to the first analog signal at 704. It will be appreciated that, as described with respect to FIG. 2, there are numerous techniques that may be used to convert the digital data to analog signals and thus, for purposes of brevity, such techniques are not described here.

The example method 700 ends at 714.

The words "example" and/or "exemplary" are used herein to mean serving as an example, instance, or illustration. Any aspect, design, etc. described herein as "example" and/or "exemplary" is not necessarily to be construed as advantageous over other aspects, designs, etc. Rather, use of these terms is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form. Also, at least one of A and B or the like generally means A or B or both A and B.

Although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated example implementations of the disclosure. Similarly, illustrated ordering(s) of acts is not meant to be limiting, such that different orderings comprising the same of different (e.g., numbers) of acts are intended to fall within the scope of the instant disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A computed tomography apparatus, comprising:
   a stationary unit;
   a rotating unit;
   a transmitter operably coupled to one of the stationary unit or the rotating unit for transferring information between the stationary unit and the rotating unit, the transmitter comprising:
      a first member defining a first channel, and
      an electrically conductive first element positioned within the first channel, the electrically conductive first element configured to generate a first electric field in response to a first current flow in the electrically conductive first element, wherein the first member is non-magnetic and no magnetic material is disposed between the first member and the electrically conductive first element; and
   a receiver operably coupled to the other of the stationary unit or the rotating unit, the receiver comprising:
      a second member defining a second channel facing the first channel, and
      an electrically conductive second element positioned within the second channel, the electrically conductive second element configured to have a second current induced therein based upon the first electric field.

2. The computed tomography apparatus of claim 1, wherein at least one of the electrically conductive first element or the electrically conductive second element comprises:
   a substantially planar surface; and
   a substantially non-planar surface.

3. The computed tomography apparatus of claim 2, wherein a dielectric material is in contact with the substantially non-planar surface.

4. The computed tomography apparatus of claim 2, wherein the substantially planar surface abuts an airgap defined between the transmitter and the receiver.

5. The computed tomography apparatus of claim 1, wherein at least one of the electrically conductive first element or the electrically conductive second element comprises a braided wire.

6. The computed tomography apparatus of claim 1, wherein:
   the first member is separated from the second member by an airgap, and
   the first member and the second member are configured to substantially confine the first electric field within the airgap.

7. The computed tomography apparatus of claim 1, wherein the first member comprises an aluminum portion and a dielectric portion.

8. The computed tomography apparatus of claim 1, wherein a first portion of the first member is an electrically conductive wire proximate an airgap between the first member and the second member and a remaining portion of the first member is a dielectric material.

9. The computed tomography apparatus of claim 1, the information being transferred between the electrically conductive first element and the electrically conductive second element within a frequency range of about 100 kHz to about 50 MHz.

10. The computed tomography apparatus of claim 1, wherein the transmitter is operably coupled to the stationary unit and the receiver is operably coupled to the rotating unit.

11. The computed tomography apparatus of claim 1, wherein the rotating unit comprises the second member.

12. An imaging modality, comprising:
a first unit and a second unit, wherein:
one of the first unit or the second unit is configured for rotation and another one of the first unit or the second unit is configured to be stationary,
the unit that is configured for rotation comprises:
a radiation source configured to emit radiation onto an object being imaged; and
a detector array configured to detect radiation that traverses the object
the first unit comprises:
a digital-to-analog converter configured to convert a digital signal into an analog signal;
a transmitter coupled to the digital-to-analog converter and comprising:
a first member defining a first channel, and
an electrically conductive first element positioned within the first channel, the electrically conductive first element configured to generate a first electric field in response to the analog signal being applied thereto; and
a transformer having a first winding physically coupled to the digital-to-analog converter and a second winding physically coupled to the electrically conductive first element, the transformer configured to match an impedance of the analog signal output by the digital-to-analog converter to an impedance of the analog signal applied to the electrically conductive first element, and
the second unit comprises:
a receiver comprising:
a second member defining a second channel facing the first channel, and
an electrically conductive second element positioned within the second channel, the electrically conductive second element configured to have a second current induced in the electrically conductive second element based upon the first electric field; and
an analog-to-digital converter coupled to the receiver and configured to restructure the digital signal based upon the second current.

13. The imaging modality of claim 12, wherein the second unit is configured for rotation and the first unit is configured to be stationary.

14. The imaging modality of claim 13, wherein the second member at least partially supports at least one of the radiation source or the detector array.

15. The imaging modality of claim 12, wherein the first member and the electrically conductive first element are separated from the second member and the electrically conductive second element by an airgap.

16. The imaging modality of claim 15, wherein the first member and the second member are configured to substantially confine the first electric field to the airgap.

17. The imaging modality of claim 12, wherein at least one of:
the electrically conductive first element comprises a flat surface facing the second channel, or
the electrically conductive second element comprises a flat surface facing the first channel.

18. The imaging modality of claim 12, wherein at least one of the electrically conductive first element or the electrically conductive second element comprises a braided wire.

19. The imaging modality of claim 12, wherein the first member and the second member are substantially circularly symmetric.

20. A method for communicating information between a rotating unit of an imaging apparatus and a stationary unit of the imaging apparatus, comprising:
while rotating the rotating unit and a radiation source coupled to the rotating unit:
converting a digital signal to an analog signal;
altering an impedance of the analog signal;
applying the analog signal to an electrically conductive first element situated within a first channel defined by a first electrical shield after altering the impedance;
inducing, via the analog signal, a second current in an electrically conductive second element situated within a second channel defined by a second electrical shield, the second channel facing the first channel, and the electrically conductive second element separated from the electrically conductive first element by an airgap; and
translating the second current to digital data.

* * * * *